US010577561B2

(12) United States Patent
Lavoine-Hanneguelle

(10) Patent No.: US 10,577,561 B2
(45) Date of Patent: Mar. 3, 2020

(54) PROCESS FOR OBTAINING A SCENTED EXTRACT OF FRESH FLOWERS AND/OR LEAVES USING NATURAL SOLVENTS

(75) Inventor: Sophie Lavoine-Hanneguelle, Mouans-Sartoux (FR)

(73) Assignee: CHARABOT, Grasse (FR)

( * ) Notice: Subject to any disclaimer, the term of this patent is extended or adjusted under 35 U.S.C. 154(b) by 466 days.

(21) Appl. No.: 13/996,693

(22) PCT Filed: Dec. 22, 2011

(86) PCT No.: PCT/FR2011/000674
§ 371 (c)(1),
(2), (4) Date: Sep. 5, 2013

(87) PCT Pub. No.: WO2012/085366
PCT Pub. Date: Jun. 28, 2012

(65) Prior Publication Data
US 2013/0338241 A1 Dec. 19, 2013

(30) Foreign Application Priority Data
Dec. 23, 2010 (FR) ..................... 10 05098

(51) Int. Cl.
C11B 9/02 (2006.01)
B01D 11/04 (2006.01)
A23L 27/10 (2016.01)

(52) U.S. Cl.
CPC ............... C11B 9/025 (2013.01); A23L 27/11 (2016.08); B01D 11/0407 (2013.01)

(58) Field of Classification Search
None
See application file for complete search history.

(56) References Cited

U.S. PATENT DOCUMENTS

| 7,157,411 | B2 * | 1/2007 | Rohde | A61L 9/01 510/106 |
| 8,287,934 | B2 * | 10/2012 | Ley | A21D 2/14 424/401 |
| 9,108,380 | B2 * | 8/2015 | Binger | B65D 33/28 |
| 2003/0206980 | A1 | 11/2003 | Butters et al. | |
| 2008/0190789 | A1 * | 8/2008 | D'Amico | A61L 9/12 206/229 |
| 2009/0305928 | A1 * | 12/2009 | Oertling | C07D 303/06 510/103 |
| 2010/0310479 | A1 * | 12/2010 | Ott | A23G 4/06 424/49 |
| 2011/0104092 | A1 * | 5/2011 | Panten | C11B 9/0019 424/65 |

FOREIGN PATENT DOCUMENTS

| CN | 1673324 A | * | 9/2005 | |
| CN | 1810763 A | * | 8/2006 | |
| CN | 101322503 A | * | 12/2008 | |
| EP | 0309339 | | 3/1989 | |
| ES | 2238183 A1 | * | 8/2005 | ............... A61K 8/97 |
| IN | 183454 B | * | 1/2000 | |
| JP | 2005213327 A | * | 8/2005 | |
| KR | 2010042090 A | * | 4/2010 | |
| WO | 2007/091901 | | 8/2007 | |
| WO | 2008/153426 | | 12/2008 | |

OTHER PUBLICATIONS

Viable Herbal Solutions (see cited website of www.web.archive.org/web/20000124113842/http://viable-herbal.com/herbology1/herbs42).*
CRS, CR Scientific, LLC, Online, URL< http://www.crscientific.com/article-distilling-oils.html > 8 pages, published online Sep. 15, 2009.*
Essential Oils; Online, URL < http://www.essentialoils.co.za/essential-oils/jasmine.htm >, archived to Mar. 11, 2008 using www.archive.org.*
Lawless the Illustrated Encyclopedia of Essential Oils; Harper Collins Publsihers, Hammersmith, London, 1995, p. 50.*
Mukhopadhyay, M. Natural Extracts Using Supercritical Carbon Dioxide; CRC Press LLC, Boca Raton, FL, 2000, pp. 147-150.*
Wikipedia: Fragrance Extraction; Wikipedia, Online, URL < https://en.wikipedia.org/wiki/Fragrance_extraction > 3 pages, archived to Jun. 2007 with www.archive.org.*
PCT, International Search Report, International Application No. PCT/FR2011/000674 (dated May 3, 2012, published Jun. 28, 2012).
"Flowering Tops"; BU Clinical and Translational Science Institute; BU Profiles; http://profiles.bu.edu/display/146497 (at least as early as Apr. 23, 2016).

* cited by examiner

Primary Examiner — Amy L Clark
(74) Attorney, Agent, or Firm — Thompson Hine LLP

(57) ABSTRACT

The invention relates to methods for obtaining a scented extract from fresh flowers, flowering heads and/or leaves of a moist plant. The method includes picking the flowers, flowering tops and/or leaves of the plant and infusing them in at least one bath comprising an alcoholic solvent, at a temperature below 50° C., to obtain an alcoholic mixture. The alcoholic mixture is then filtered to recover an alcoholic floral infusion. The method also includes performing a supercritical $CO_2$ extraction of the alcoholic floral infusion to obtain a scented extract. This scented extract has an alcohol titrate of at least 75%. The invention also relates to scented water or perfume, food flavoring, and cosmetic compositions that contain the scented extract as an ingredient.

15 Claims, 2 Drawing Sheets

Figure 1:
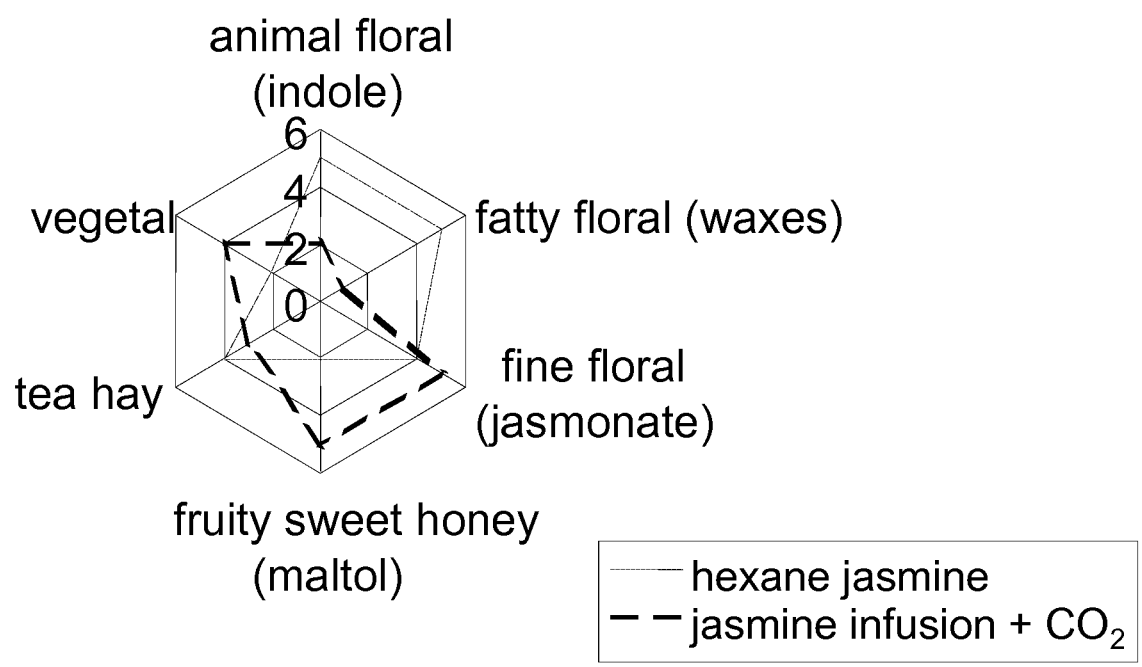

PROCESS FOR OBTAINING A SCENTED EXTRACT OF FRESH FLOWERS AND/OR LEAVES USING NATURAL SOLVENTS

The invention relates to a process for obtaining a scented extract from fresh flowers, flowery tops and/or leaves using a combination of natural solvents, the extracts thus obtained and the uses of same.

Fresh flower and/or leaf extracts are used in particular in perfumes, cosmetics and flavors, and more specifically those of fragrant flowers or leaves such as, for example, jasmine, mimosa, rose, bitter orange, or basil.

It is known to be difficult to grow and process plants such as jasmine because their flowers are fragile, picking is very labor-intensive and requires great care, and obtaining a concrete is very costly insofar as it requires a very large number of flowers or leaves to obtain a small amount of extract that can be used in perfumery. For example, no fewer than seven million jasmine flowers are needed to obtain one kilogram of absolute.

Traditionally, two types of processes are performed to obtain a scented extract.

An extraction is performed using volatile non-polar solvents obtained from petrochemistry, such as hexane, benzene or petroleum ether. The water from the plants is then decanted, and the solvent containing the fragrance is concentrated under vacuum to produce the concrete.

Or an extraction of the scented substances from plant matter is performed by steaming. This process is not suitable, however, for certain fragile flowers (jasmine, tuberose, mimosa), because it degrades certain scented components, and the extracts obtained are not useable in terms of quality and/or yield.

Similarly, supercritical $CO_2$ extraction and the industrial equipment that it requires is very complicated to implement for such fresh flowers, which can be preserved only for a very short time after they have been picked and are difficult to transport. The yields capable of being obtained using this process are also very low.

Thus, the floral products currently offered on the market are either essential oils, concretes obtained using non-polar petroleum solvents or more commonly absolutes obtained from the retreatment with supercritical $CO_2$ or alcohol washes of such concretes.

However, the composition of the products obtained by such processes is substantially different from the raw material, and the respective scent is not comparable to that of the fresh flower. Non-polar solvents extract, in particular, fatty materials, which confer fatty notes on the concretes. Also, the need for a petroleum solvent does not comply with the Cosmebio charter.

Document EP0309339 is also known, which more specifically discloses a process for preparing a scented jasmine flower composition obtained by hydrolysis of the isolated compounds and in particular precursors, by extracting flowers with an aqueous or hydro-alcoholic polar solvent.

However, such extracts show the presence of linalol, geraniol, benzyl alcohol, phenyl-2-ethanol, methyl-2-phenol, eugenol, isophytol, phytol and cis-jasmone in non-negligible amounts and in variable proportions and different from those of the absolute obtained from the same flowers. Also, the scented note of these extracts is pleasant but sharper and spicier than those of the corresponding absolutes, and the scent is not comparable to that of the fresh jasmine flower.

In general, there is a real demand for obtaining a scented extract from fresh flowers or leaves using natural solvents, with a yield at least comparable to those for obtaining an essential oil or an absolute of the same flower, with the extract having a fragrance substantially similar to that of the natural flower and capable of being used as such in perfumery.

In consideration of the above, a problem to be solved by the invention is that of implementing a process for obtaining a scented extract from fresh flowers and/or leaves by a combination of natural solvents, not obtained from petrochemistry, and that complies with the Cosmebio charter, which defines the basic principles of ecological and biological cosmetics according to specifications certified by Ecocert. Such a process is easy to implement, efficient, and the scented extracts thus obtained have a scent substantially similar to that of the fresh flower, different from the traditional perfumery standards.

The process according to the invention offers, in particular, the following advantages over the prior art:
 the process enables a scented extract to be obtained from moist and fragile plants such as fresh flowers, for example, fresh jasmine flowers;
 the process is easy to implement, in particular with regard to the primary extraction, which can thus be performed with rudimentary equipment on site;
 the process is economical in terms of energy and financial expenditures, as extraction times are short;
 the process enables preservation of the fresh plants over a number of weeks and even a number of months, in the form of a primary extract, which enables them to be transported over long distances and their treatment to be spread out over time;
 the process uses natural solvents, not obtained from petrochemistry;
 the process produces yields in terms of concentrate that are at least similar and comparable to those obtained according to the traditional processes,
 the process produces an extract that is substantially dewaxed, stable, and
 the scented extracts obtained have a scent substantially similar to that of the fresh plant, and can be used in perfumery.

The invention therefore first relates to a process for obtaining a scented extract from fresh flowers, flowering tops, and/or leaves of a moist plant including the following steps, wherein: a) the flowers, flowering tops and/or leaves of the plant are picked; b) said freshly cut flowers, flowering tops, and/or leaves are infused in at least one bath including an alcoholic solvent, at a temperature below 50° C., so as to obtain an alcoholic mixture; c) said alcoholic mixture is filtered so that an alcoholic floral infusion is recovered; and d) a supercritical $CO_2$ extraction of the alcoholic floral infusion is performed to obtain said scented extract, this scented extract being titrated with at least 75% alcohol.

The invention secondly relates to an extract prepared by the process according to the invention.

Finally, the invention thirdly relates to the method of providing an extract according to the invention to prepare a perfume, a perfumed dilution alcohol, a perfumery ingredient, a food flavoring or in the composition of a cosmetic product.

Figure 2:
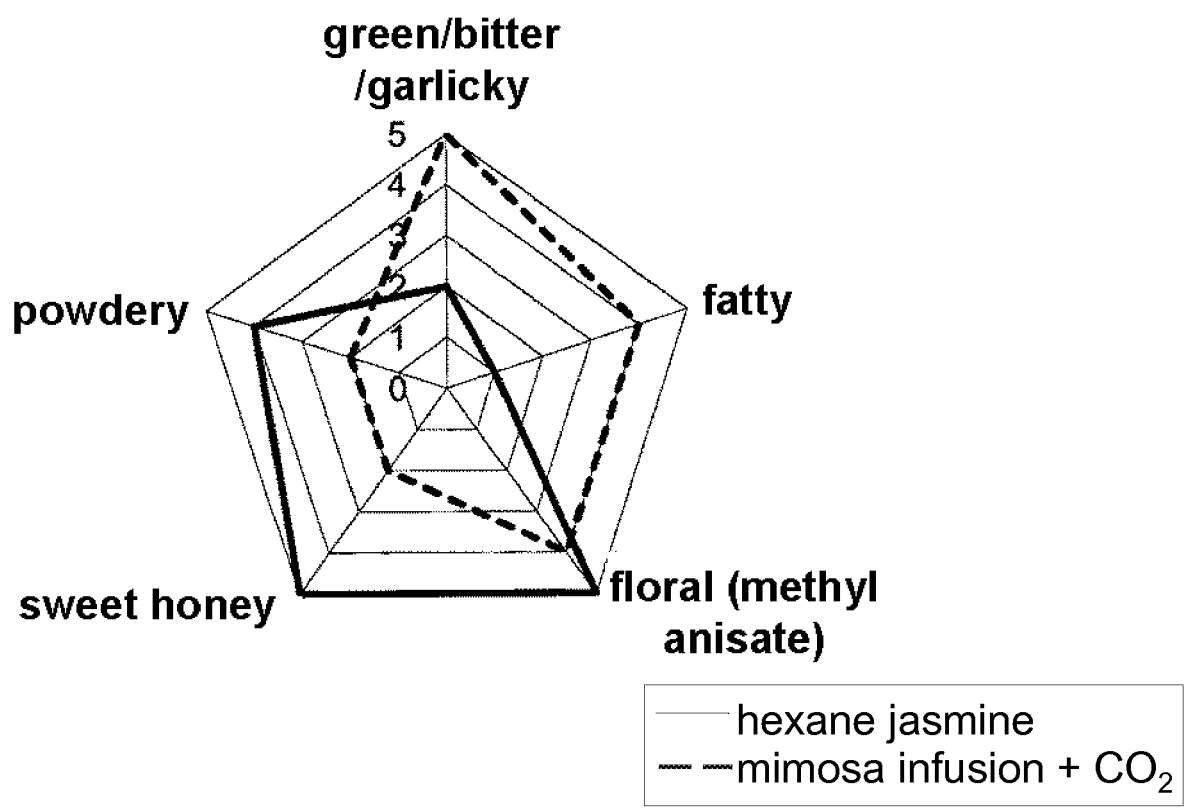

The invention and the advantages resulting therefrom will be easier to understand in view of the following description and non-limiting embodiments, with reference to the appended figures, wherein:

FIG. 1 shows a floral diagram wherein the scent of a hexane jasmine flower extract is compared with that of an extract obtained according to the process according to the invention; and FIG. 2 shows a floral diagram wherein the scent of a hexane *mimosa* flower extract is compared with that of an extract obtained according to the process according to the invention.

The process according to the invention is implemented so as to obtain a scented extract from fresh flowers, flowering tops, and/or leaves, particularly fragile, from a moist plant.

A moist or fresh plant is a living organism forming part of the plant kingdom, which comprises at least 70% water by weight of its total weight, conventionally around 85% water, before or after loss to desiccation in particular associated with picking.

As a non-limiting example of fragile fresh flowers, flowering tops and/or leaves according to the invention, it is possible to cite jasmine and in particular among more than 200 species, *Jasminum grandiflorum, Jasminum officinale, Jasminum odoratissimum, Jasminum sambac, Jasminum auriculatum, Jasminum flexile*, mimosa, rose, tuberose, genet, bitter orange, carnation, violet, *verbena*, linden, chamomile, basil leaf, coriander leaf, frangipani, tiaré, *gardenia*, marigold, French marigold, *narcissus*, hyacinth, daffodil, lily, *magnolia*, lily of the valley, ylang-ylang, *osmanthus*, lilac, honeysuckle or *geranium*.

In a first step of the process according to the invention, the important parts of the plant are picked, namely the flowers, flowering tops and/or leaves.

Such freshly picked flowers, flowering tops and/or leaves are very fragile and can be preserved as is only for a short time, at most several hours, for example 12 hours, and will preferably be used within 3 hours after picking to prevent degradation and loss of a large part and sometimes all of their scented, and primarily fragrant, qualities.

For example, jasmine flowers degrade 3 hours after being picked, and mimosa or tuberose flowers can be preserved as is for up to 12 hours.

Then, according to the process according to the invention, said freshly picked flowers, flowering tops and/or leaves are infused in at least one bath containing an alcoholic solvent, at a temperature below 50° C., so as to obtain an alcoholic mixture.

As an example of an alcoholic solvent according to the invention, a natural alcohol is used, chosen from methanol, ethanol, propanol 1, 2-propanol, butanol, isobutanol, pentanol, isoamylic alcohol and preferably ethanol which has a lower boiling point (except for methanol) and which is much less toxic than methanol in particular.

According to the invention, the flowers, flowering tops and/or leaves are preferably infused in the alcoholic solvent at room temperature, i.e. at a temperature between 15 and 35° C.

The duration of the infusion step according to the invention can be up to several hours, for example 12 hours, and will have an influence on the olfactory profile of the extract.

Advantageously, the duration of the infusion according to the invention was optimized and is between around ten minutes to around two hours, a time necessary and sufficient for extracting the scented molecules collected in the primary scented alcohol extract according to the invention.

In the infusion, the flowers, flowering tops and/or leaves are steeped in the alcoholic solvent and can be gently stirred.

Advantageously, the infusion is produced by circulating the solvent in a closed circuit, i.e. the solvent is circulated over the flowers, flowering tops and/or leaves so as to create movement in the extractor, without breaking in particular the petals, and avoiding areas of saturation of the solvent at the periphery of the petals. The stirring thus provides less saturated solvent, which in turn will perform the extraction.

Alternatively, it is possible to produce infusions in a plurality of concomitant or sequential baths, depending on the quantity of flowers and/or leaves to be treated.

It is possible, for example, to produce a single bath, then perform a rinsing with the new extraction solvent, a plurality of baths with the same flowers and/or leaves, or even a plurality of passes of flowers and/or leaves over the same bath because of the low ethanol saturation, for a final weight/weight flower-leaf/alcoholic solvent ratio of 1:1 to 1:10, preferably 1:1 to 1:3.

For example, the flowers and/or leaves are advantageously passed multiple times through the same alcohol bath in order to saturate it, for example up to 5 passes, enabling the primary alcoholic extract to be concentrated. This is more economical in terms of volumes to be transported and subsequently treated with supercritical $CO_2$.

Then, according to the process according to the invention, the flowers, flowering tops and/or leaves are drained, without being crushed, and the alcoholic mixture thus obtained is filtered so as to recover an alcoholic floral infusion capable of being kept cool at a temperature of around 4 to 10° C. for a period of one day to a number of months.

Such an alcoholic floral infusion according to the invention is a product that is possibly colored, with an especially high water and sugar content, and titrated with at least 45% alcohol.

This infusion step according to the invention is essential because it makes it possible to preserve, for several weeks, at between 4 and 10° C. in the form of an alcoholic floral infusion, an extract of fresh fragile flowers and/or leaves that would not stay fresh, and without altering the scented qualities. Indeed such fresh flowers and/or leaves must be used quickly after being picked to prevent drying and loss of all of their scented and primarily fragrant qualities.

To this effect, advantageously, the process according to the invention also comprises a step wherein the alcoholic floral infusion is kept fresh at a temperature of around 4 to 10° C. for a period of between 1 day and several months, for example 12 or even 24 months.

Thus, the process according to the invention is easy to implement and limits the time constraints. Moreover, the process according to the invention makes it possible to guard against complex logistics associated with the bulk of the extraction equipment and the fact that the plants containing it are often not located near the harvesting sites. Instead, the alcoholic floral infusion obtained according to the invention can easily be transported to sites where it will undergo the refining necessary for obtaining a scented extract smelling of fresh flowers and/or leaves according to the invention.

To this end, according to the process according to the invention, a supercritical $CO_2$ extraction of the alcoholic floral infusion is performed in order to obtain said scented extract.

Advantageously, this scented extract obtained according to the invention is titrated with at least 75% alcohol.

The supercritical $CO_2$ extraction process is known. In the supercritical state, namely more than 74 bars and 31° C., the $CO_2$ has very specific properties and can be used as a natural extraction solvent. The fluid obtained is characterized by a high diffusivity (on the order of that of gases), which makes it suitable for diffusion, and a high density, which makes it highly suitable for transport and extraction.

The supercritical $CO_2$ extraction step according to the invention can be performed in static mode or in dynamic mode.

According to the invention, $CO_2$ is preferably used at a pressure of between 130 and 200 bars and at a temperature of between 35 and 55° C., even more preferably at 150 bars and 45° C., at counter-current, and is particularly suitable for obtaining a clear, limpid and stable scented extract of fresh flowers and/or leaves largely free of sugars, colorants, water and titrated with at least 75% alcohol.

Advantageously, the process according to the invention also comprises a step wherein the scented extract obtained after extraction with supercritical $CO_2$ is concentrated as is, under vacuum by gentle heating below 60° C., or on a substrate such as natural oil, Shea butter, natural glycerin or a natural fragrant molecule such as natural benzyl acetate.

In addition, the process according to the invention gives yields at least similar to those obtained with the traditional processes for obtaining an essential oil or an absolute from these same flowers, and greater than those obtained by extraction directly on the flowers with supercritical $CO_2$.

As an example, according to the process according to the invention, mass yields equivalent to 2 kg of flowers per kg of extract are obtained.

Moreover, when such an extract obtained according to the process according to the invention is concentrated, yields are obtained with the flower on the order of 0.1% to 0.2%, i.e. 0.5 to 1 tonne of flowers per kg of extract, equivalent to those obtained for the absolute.

As an example, the table below shows, with measurements performed in gas chromatography by the applicant, the composition of an extract obtained according to the process according to the invention, using 750 kg of Jasminum grandiflorum flowers picked in the Maritime Alps from August to October 2010. Two hours after being picked, these flowers were infused, gently stirred, in natural ethanol at 25° C. for 20 minutes, with the flower/ethanol ratio being 1:1 by weight. Then, the flowers were drained, without being too crushed, and rinsed. The alcoholic floral infusion was then filtered and packaged for 2 to 3 months pending the supercritical $CO_2$ extraction. Finally a supercritical $CO_2$ extraction of the alcoholic floral infusion was performed at 45° C. and 150 bars for 20 minutes. The scented extract thus obtained according to the invention was then partially concentrated under vacuum at low temperature (35° C.). To this effect, in the table below, the composition of the scented extract according to the invention thus obtained was compared with that of a traditional absolute obtained by hexane extraction from the same flower harvest and diluted to 10% in alcohol.

| Molecules identified | Jasmine hexane absolute | Concentrate of a jasmine extract obtained according to the invention |
|---|---|---|
| cis-3-hexenol | 0.06 | — |
| trans-2-hexenol | 0.05 | — |
| diethyl oxalate | — | 0.16 |
| phenylacetaldehyde | — | 0.25 |
| benzyl alcohol | 1.8 | 3.17 |
| methyl benzoate | 0.25 | — |
| maltol | 0.22 | 1.19 |
| p-cresol + linalol | 3.16 | 4.45 |
| phenylethyl alcohol | 0.21 | — |
| benzyl acetate | 11.48 | 11.12 |
| ethyl benzoate | — | 0.11 |
| methyl salicylate | 0.05 | — |
| α terpineol | 0.07 | — |
| benzoic acid | 0.39 | 0.37 |
| phenylethyl acetate | 0.06 | — |
| geraniol | 0.07 | — |
| indole | 0.38 | — |
| methyl anthranilate | — | 0.17 |
| eugenol | 2.12 | 0.51 |
| vanillin + cis jasmone | 1.95 | 2.16 |
| isoeugenol + geranyl acetone | 0.13 | 0.15 |
| jasmine lactone | 0.85 | 0.23 |
| c15 alkane | 0.17 | — |
| c, t α farnesene | 0.08 | — |
| t, t α farnesene | 1.87 | 2.53 |
| benzoate c-3-hexanyl + lactone δ | 1.23 | 1.97 |
| methyl acetylanthranilate | 0.57 | 0.48 |
| methoxy-6-eugenol | 0.14 | 0.2 |
| t methyl jasmonate | 0.69 | 0.47 |
| c methyl jasmonate | 0.22 | 0.75 |
| coniferyl aldehyde | 0.16 | — |
| coniferyl alcohol | — | 0.43 |
| benzyl benzoate | 10.12 | 9.35 |
| trimethylpenadecanone-2 | 1.82 | 1.6 |
| benzyl salicylate | 0.62 | 0.32 |
| methyl palmitate | 0.87 | 0.9 |
| isophytol | 9.81 | 10.8 |
| ethyl palmitate + C16 acid | 0.87 | 0.42 |
| geranyllinalol | 3.71 | 5.63 |
| methyl linolenate | 1.95 | 1.8 |
| phytol | 13.58 | 15.31 |
| ethyl linolenate + isophytyl acetate | 2.02 | 0.58 |
| phytyl acetate | 4.68 | 3.59 |
| C23 alkane | 0.27 | — |
| phenylethyl linolenate | 0.72 | — |
| squalene | 1.82 | 1.52 |
| epoxydihydrosqualene | 3.41 | — |

This table shows, on the basis of the results obtained, differences in composition between a jasmine flower extract obtained according to the process according to the invention and a hexane absolute of these same flowers.

More specifically, the jasmine flower extract obtained according to the process according to the invention comprises, in particular, in significant amounts, more methyl jasmonate and maltol than the hexane absolute does, and contains phenylacetaldehyde, whereas the hexane absolute does not contain it.

Also, the jasmine flower extract obtained according to the process according to the invention comprises, in a significant amount, less eugenol than the hexane absolute does, and does not comprise geraniol or indole in this production.

In addition, if it is compared with the compounds identified in the extract disclosed in document EP0309339, the extract obtained according to the process according to the invention does not contain, for example, geraniol or phenyl-2-ethanol.

Thus, such differences in composition between the extracts are characterized by substantially different scents.

Indeed, as shown in FIG. 1, the applicant performed a scent test using 8 professionals in order to compare the scents of the 2 jasmine flower extracts mentioned in the table above.

This floral diagram shows, on the basis of the results obtained, differences in scent between the 2 extracts characterized by the differences in composition mentioned in the table above.

The extract obtained according to the process according to the invention has fine floral scents due, in particular, to the jasmonates as well as a sweet, fruity honey scent due, in particular, to the maltol. Also, very vegetal notes are observed, of tea hay, characteristics of the scent of the local country, jasmine flowers and bushes with the extract obtained according to the process according to the invention, which is not the case with the hexane extract. However, the absence of indole and waxes in this extract according to the invention makes it possible to limit the powerful animal and fatty floral scent characteristic of these compounds, found only in the hexane extract.

As an example, the extract obtained according to the process according to the invention using jasmine flowers is in the form of a very pale yellow to yellow, limpid, mobile, transparent liquid, and has a native fresh flower scent. After concentration, a concentrate is obtained that is in the form of a very powerful brown-green liquid or paste with jasmine, vegetal, fruity, honey notes.

Similarly, the table below shows, with measurements performed in gas chromatography by the applicant, the composition of an extract obtained according to the process according to the invention using 2 kg of mimosa flowering branches picked in the Tanneron Massif in March 2010. Four hours after being picked, these mimosa flowering branches were infused in 6 kg of natural ethanol circulating at 25° C. for 2 hours, with the mimosa flowering branch/ethanol ratio being 1:3 by weight. The alcoholic floral infusion was then filtered and packaged pending the supercritical $CO_2$ extraction for 3 weeks. Finally, a supercritical $CO_2$ extraction of the alcoholic floral infusion was performed at 45° C. and 150 bars for 20 minutes. The scented extract thus obtained according to the invention was then concentrated under vacuum, iced and filtered, for a soluble concentrate yield of the flower of 0.40% in this trial. To this effect, the composition of the scented extract according to the invention thus obtained is compared in the table below with that of a traditional absolute obtained by hexane extraction from the same harvest of mimosa flowering branches and diluted to 10% in alcohol.

| Molecules identified GC analysis/non-polar | Kovats index | Hexane absolute of Mimosa branches | Concentrate of a Mimosa branch extract obtained according to the invention |
|---|---|---|---|
| volatile[a]/heavy[b] content | | 0.12 | 0.68 |
| cis-3-hexenol | 839 | 0.03 | — |
| diethyloxalate | 940 | — | 0.08 |
| benzyl alcohol | 1010 | 0.09 | 0.29 |
| ethyl heptanoate | 1080 | 0.05 | nd |
| phenylethyl alcohol | 1096 | 0.17 | 0.1 |
| 2,3-dihydro-3,5-dihydroxy-6-methylpyran-4-one [28564-83-21] | 1115 | — | 0.06 |
| ethyl benzoate | 1146 | 0.04 | nd |
| benzoic acid | 1152 | 0.04 | 0.47 |
| octanoic acid | 1170 | — | 0.18 |
| 5-hydroxymethyl furfural | 1176 | — | 0.09 |
| 2,3-dihydrobenzofuran | 1194 | — | 0.16 |
| anisaldehyde | 1224 | 0.02 | 0.09 |
| anisic alcohol | 1267 | 0.03 | 0.13 |
| methyl anisate | 1327 | 0.03 | 0.08 |
| DEA ald C9 | 1371 | 0.04 | 0.05 |
| ethyl anisate | 1424 | 0.07 | — |
| C15 alkane | 1500 | 0.05 | 0.28 |
| C16 alkene | 1584 | 0.03 | 0.17 |
| C16 alkane | 1600 | — | 0.14 |
| heptadecadiene | | 0.04 | 0.63 |
| heptadec-8-ene | 1684 | 2.05 | 12.6 |
| C17 alkane | 1700 | 0.38 | 2.2 |
| benzyl benzoate | 1726 | 0.04 | 0.04 |
| C18 alkane | 1800 | 0.07 | 0.24 |
| 6,10,14 trimethylpentadecan-2-one | 1830 | 0.08 | 0.23 |
| C19 alkene | 1894 | 0.05 | 0.11 |
| heptadecenal | | — | 0.2 |
| C19 alkane | 1900 | 1.79 | 6.91 |
| heptadecanal | 1897 | — | 0.41 |
| ethyl palmitate | 1976 | 0.96 | 0.96 |
| C20 alkane | 2000 | 0.72 | 0.16 |
| alpha-kaurene | 2006 | — | 0.09 |
| C21 alkane | 2100 | 0.51 | 1.82 |
| ethyl linolenate | 2153 | 0.72 | 0.35 |
| C23 alkane | 2300 | 0.24 | 2.83 |
| C24 alkane | 2400 | — | 0.21 |
| C25 alkane | 2500 | 0.02 | 0.69 |
| Lupenone | | 52.08 | 29.35 |
| Lupeol | | 7.03 | 3.95 |

[a]volatile compounds of which the Kovats index is below 2500
[b]background compounds based on the Kovats index equal to 2500.

This table shows, on the basis of the results obtained, a notable variation in the chemical balance between the most volatile compounds (the most scented) and the heaviest compounds to the advantage of the mimosa flowering branch extract (0.68) obtained according to the process according to the invention with respect to the classic extract (hexane then ethanol) (0.12). Composition differences are thus observed between this extract obtained in the process according to the invention and the absolute, and in particular the mimosa flowering branch extract obtained according to the process according to the invention comprises, in a significant amount, more heptadec-8-ene than the hexane absolute, and comprises two times less lupenone and lupeol in this production.

Thus, such composition differences between the extracts are characterized by substantially different scents.

Indeed, as shown in FIG. 2, the applicant performed a scent test with 8 professionals in order to compare the scents of the 2 mimosa flowering branch extracts mentioned in the table above.

This floral diagram shows, on the basis of the results obtained, differences in scent between the 2 extracts characterized by the composition differences mentioned in the table above.

The extract obtained according to the process according to the invention has fine floral scents characteristic of methyl anisate, very vegetal, powdery and faithful to the scent of mimosa. By contrast, the hexane absolute has a powerful green, fatty (cis-3-hexenol) floral note, powerful head note with a weaker and less persistent background note.

As an example, the extract obtained according to the process according to the invention based on mimosa flowering branches is in the form of a mobile alcoholic liquid titrated at more than 85% by weight of alcohol, transparent yellow and with a very light, gentle honey scent, characteristic of fresh mimosa flowers. After concentration, a concentrate is advantageously obtained that can be iced and filtered, and then becomes pasty, darker, olive green, its odor intensifying with floral, honey and vegetal notes.

The process according to the invention thus makes it possible to obtain a scented fresh flower and/or leaf extract using natural solvents, not obtained from petrochemistry, and which complies with the Cosmebio charter that defines the basic principles of ecological and organic cosmetics according to specifications certified by Ecocert. The process according to the invention makes it possible to obtain scented extracts that are faithful to the scent of natural fresh flowers, and that are different from the traditional perfumery standards.

In addition, according to another aspect, the invention relates to an extract prepared by the process according to the invention.

Such extracts are very difficult to characterize as such because they vary, for the same species, according to different factors such as the flowers used, the harvest site, or the harvest year.

According to a third aspect of the invention, the extracts thus obtained according to the process according to the invention can be used as is as a perfume, or a perfumed dilution alcohol, or a perfumery ingredient. Such extracts can advantageously replace the neutral dilution alcohol of a scented water or a perfume. They can also be used in concentrated form.

Indeed, the extract obtained after supercritical $CO_2$ extraction is a natural alcohol delicately performed with the plant matter such as the jasmine flower, a limpid liquid that can be used as is. The extract has not been degraded by heating, and the scent is very faithful to that of the plant. In addition, the extract according to the invention is stable during storage, whereas the absolute, for example the jasmine absolute, deposits wax over time (sediment), influencing its appearance and even its scent.

The extract according to the invention can also be used as a food flavoring or in the composition of a cosmetic product.

As an example of a cosmetic composition, compositions intended for topical use in particular on the skin, such as a gel, a cream, a milk, a lotion, an oil, a shampoo or a soap can be cited.

Of course, the invention is not limited to the embodiments and the examples presented above, and a person skilled in the art, performing routine operations, may be led to produce other embodiments not explicitly described, which fall within the broad scope of the invention.

The invention claimed is:

1. A method for obtaining a scented extract from fresh flowers, flowering tops, and/or leaves of a moist jasmine or mimosa plant, the method comprising:
   picking flowers, flowering tops and/or leaves of a moist jasmine or mimosa plant;
   infusing within 12 hours after picking and without breaking said flowers, flowering tops, and/or leaves in at least one bath including an alcoholic solvent comprising ethanol, at a temperature below 50° C., to obtain an alcoholic mixture comprising a final weight/weight flower-leaf to alcohol ratio of 1:1 to 1:3; wherein said flowers, flowering tops, and/or leaves are passed multiple times through the at least one bath including the alcoholic solvent, and wherein the infusing is performed at a temperature of between 15° C. and 35° C. for a period of about ten minutes to about two hours;
   filtering said alcoholic mixture to recover an alcoholic floral infusion; and
   performing a supercritical $CO_2$ extraction of the alcoholic floral infusion to obtain a scented extract in alcohol.

2. The method according to claim 1, wherein infusing includes circulating the alcoholic solvent.

3. The method according to claim 1, further comprising cooling the alcoholic floral infusion at a temperature of about 4 to 10° C. for a period of between 1 day and a number of months.

4. The method according to claim 1, wherein performing the supercritical $CO_2$ extraction includes applying a pressure of between 130 and 200 bars and a temperature of between 35 and 55° C.

5. The method according to claim 1, further comprising concentrating the scented extract under vacuum by heating at a temperature below 60° C. to form a concentrated scented extract.

6. The method according to claim 5, wherein the scented extract or the concentrated scented extract comprises methyl jasmonate, maltol, and phenylacetaldehyde.

7. The method according to claim 1, further comprising applying the scented extract to the skin as a perfume, or diluting the scented extract further with alcohol to form a perfumed dilution alcohol and then applying the perfumed dilution alcohol to the skin as a perfume.

8. The method of claim 1, wherein the jasmine flowers, flowering tops and/or leaves are selected from the group consisting of *Jasminum grandiflorum, Jasminum officinale, Jasminum odoratissimum, Jasminum sambac, Jasminum auriculatum*, and *Jasminum flexile*.

9. The method according to claim 1, further comprising adding the scented extract as a perfumery ingredient to a perfume medium.

10. The method according to claim 1, further comprising adding the scented extract, as a food flavoring, to a food.

11. The method according to claim 1, further comprising adding the scented extract to a cosmetically medium to form a cosmetic composition.

12. The method of claim 11, wherein the cosmetic composition is a topical composition.

13. The method of claim 1, wherein the scented extract comprises at least 75% wt/wt alcohol.

14. A method for obtaining a concentrated scented extract from fresh flowers, flowering tops, and/or leaves of a moist jasmine or mimosa plant, the method comprising:
   picking flowers, flowering tops and/or leaves of a moist jasmine or mimosa plant;
   infusing within 12 hours after picking and without breaking said flowers, flowering tops, and/or leaves in at least one bath including an alcoholic solvent comprising ethanol, at a temperature below 50° C., to obtain an alcoholic mixture comprising a final weight/weight flower-leaf to alcohol ratio of 1:1 to 1:3; wherein said flowers, flowering tops, and/or leaves are passed multiple times through the at least one bath including the alcoholic solvent, and wherein the infusing is performed at a temperature of between 15° C. and 35° C. for a period of about ten minutes to about two hours;
   filtering said alcoholic mixture to recover an alcoholic floral infusion;

performing a supercritical $CO_2$ extraction of the alcoholic floral infusion to obtain a scented extract in alcohol; and concentrating, only after performing the supercritical $CO_2$ extraction, the scented extract.

15. A method for obtaining a scented extract from fresh flowers, flowering tops, and/or leaves of a moist jasmine or mimosa plant, the method consisting essentially of:

picking flowers, flowering tops and/or leaves of a moist jasmine or mimosa plant;

infusing within 12 hours after picking and without breaking said flowers, flowering tops, and/or leaves in at least one bath including an alcoholic solvent comprising ethanol, at a temperature below 50° C., to obtain an alcoholic mixture comprising a final weight/weight flower-leaf to alcohol ratio of 1:1 to 1:3; wherein said flowers, flowering tops, and/or leaves are passed multiple times through the same bath including the alcoholic solvent, and wherein the infusing is performed at a temperature of between 15° C. and 35° C. for a period of about ten minutes to about two hours;

filtering said alcoholic mixture to recover an alcoholic floral infusion; and performing a supercritical $CO_2$ extraction of the alcoholic floral infusion to obtain a scented extract in alcohol.

* * * * *